US012587113B2

(12) United States Patent
Epskamp et al.

(10) Patent No.: US 12,587,113 B2
(45) Date of Patent: Mar. 24, 2026

(54) METHOD FOR PROVIDING A VOLTAGE FOR A LOAD, AND DEVICE FOR CARRYING OUT A METHOD

(71) Applicant: SEW-EURODRIVE GMBH & CO. KG, Bruchsal (DE)

(72) Inventors: Torsten Epskamp, Bretten (DE); Frank Hartmann, St. Leon Rot (DE); Alexander Stahl, Karlsruhe (DE); Christian Axtmann, Marxzell (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 197 days.

(21) Appl. No.: 18/282,620

(22) PCT Filed: Feb. 21, 2022

(86) PCT No.: PCT/EP2022/054269
§ 371 (c)(1),
(2) Date: Sep. 18, 2023

(87) PCT Pub. No.: WO2022/194493
PCT Pub. Date: Sep. 22, 2022

(65) Prior Publication Data
US 2024/0186918 A1     Jun. 6, 2024

(30) Foreign Application Priority Data
Mar. 16, 2021     (DE) .......................... 102021001370.0

(51) Int. Cl.
*H02P 3/04* (2006.01)
*H02M 7/219* (2006.01)

(52) U.S. Cl.
CPC .............. *H02P 3/04* (2013.01); *H02M 7/219* (2013.01)

(58) Field of Classification Search
CPC ........ H02P 27/08; H02P 2209/11; H02P 3/04; H02M 7/21; H02M 7/219
See application file for complete search history.

(56) References Cited

U.S. PATENT DOCUMENTS 4,849,950 A * 7/1989 Sugiura .............. H02M 7/5387
363/36
6,291,952 B1 9/2001 Roth-Stielow
(Continued)

FOREIGN PATENT DOCUMENTS

DE 19734405 A1 * 2/1999 ................ H02P 3/04
DE 102008032876 A1 1/2010
(Continued)

OTHER PUBLICATIONS

International Search Report issued in corresponding International Application No. PCT/EP2022/0542694 dated Jun. 13, 2022, pp. 1-2, English Translation.
(Continued)

*Primary Examiner* — Thai T Dinh
(74) *Attorney, Agent, or Firm* — Carter, DeLuca & Farrell LLP

(57) ABSTRACT

In a method for providing a voltage for a load, e.g., for an inductor and/or coil of an electromagnetically actuable brake, e.g., of an electric motor, and device for carrying out the method, e.g., in a manner repeated over time, the positive half-wave of an, e.g., single-phase AC voltage is provided to the load in a pulse—with modulated manner starting from a first phase angle of the AC voltage, and in an unmodulated manner, e.g., and/or uncontrolled manner and/or directly, starting from a second phase angle.

25 Claims, 6 Drawing Sheets

(56)  References Cited

U.S. PATENT DOCUMENTS

| | | | | |
|---|---|---|---|---|
| 8,125,179 B2 * | 2/2012 | Otten | ..................... | H02M 1/40 |
| | | | | 318/400.29 |
| 10,164,550 B2 | 12/2018 | Wolf | | |
| 2010/0109598 A1 * | 5/2010 | Otten | ..................... | H02M 1/40 |
| | | | | 318/811 |
| 2015/0381097 A1 | 12/2015 | Hamaguchi | | |
| 2018/0111487 A1 * | 4/2018 | Xu | ......................... | H02K 7/108 |
| 2020/0136504 A1 * | 4/2020 | Schumacher | .......... | H02M 7/12 |

FOREIGN PATENT DOCUMENTS

| | | | |
|---|---|---|---|
| DE | 102010052662 A1 | 5/2012 | |
| JP | 2001338745 A | 12/2001 | |
| WO | 99/10975 A1 | 3/1999 | |

OTHER PUBLICATIONS

Written Opinion issued in corresponding International Application No. PCT/EP2022/0542694 dated Jun. 13, 2022, pp. 1-7, English Translation.

* cited by examiner

METHOD FOR PROVIDING A VOLTAGE FOR A LOAD, AND DEVICE FOR CARRYING OUT A METHOD

FIELD OF THE INVENTION

The present invention relates to a method for providing a voltage for a load, and device for carrying out a method.

BACKGROUND INFORMATION

In certain conventional systems, with phase angle control using thyristors, the voltage is switched on abruptly.

SUMMARY

Example embodiments of the present invention provide for the operation of an electromagnetically actuable brake of an electric motor in a low-emission manner.

According to example embodiments of the present invention, in a method for providing a voltage for a load, e.g., for an inductor and/or coil of an electromagnetically actuable brake, e.g., of an electric motor, for example, in a manner repeated over time, the positive half-waves of an, e.g., single-phase AC voltage, is provided to the load in a pulse—with modulated manner starting from a first phase angle of the AC voltage, and in an unmodulated manner, e.g., and/or uncontrolled manner and/or directly, starting from a second phase angle.

Thus, the voltage is not increased abruptly at the second phase angle but increases smoothly by the preceding pulse—with modulation, e.g., in a continually differentiable manner. This reduces noise emissions and also EMC emissions.

According to example embodiments, a pulse—with modulation ratio as a function of time, e.g., or of the phase angle, is controlled between the first phase angle and the second phase angle such that an increasing curve of the voltage, e.g., a curve of the voltage that increases from zero and is averaged using a moving average over a pulse—with modulation period, is made available to the load. Thus, the voltage increase can be controlled according to a curve. Thus, a smooth curve can be achieved.

According to example embodiments, at the first phase angle, the first time derivative of the curve is zero. Thus, the voltage increases in a continually differentiable manner from zero.

According to example embodiments, at the second phase angle, the first time derivative of the curve is continual. Thus, a smooth connection of the pulse—with modulated voltage is possible. More precisely, in the case of the pulse-width modulated voltage, the average value of the voltage formed over a pulse-width modulation period, e.g., a moving average value, is smooth, i.e., continually differentiable transitioning into the voltage present according to the phase angle, smoothly increasing from zero, as with the first phase angle. In this manner, noise emissions can be reduced.

According to example embodiments, the curve is smooth, e.g., continually differentiable. Thus, noise emissions can be reduced and that a smooth voltage curve can be achieved when the voltage curve averaged over the pulse-width modulation period is considered.

According to example embodiments, the curve has clothoidal sections and/or sinusoidal sections. Thus, a smooth voltage curve can be achieved if the voltage curve averaged over the pulse-width modulation period is considered.

According to example embodiments, the curve has an S-curve. Thus, a smooth voltage curve can be achieved if the voltage curve averaged over the pulse-width modulation period is considered.

According to example embodiments, the positive half-waves of a single-phase AC voltage are fed to a parallel connection of two half-bridges, each of which has a series connection of two controllable semiconductor switches whose drive signals are generated by signal electronics, in which the voltage is made available to the load from the two nodes, e.g., the connection points of the two semiconductor switches, of the respective half-bridge, or the positive half-waves of a single-phase AC voltage are fed to a parallel connection of two half-bridges, each of which has a series connection of a controllable semiconductor switch and a diode, in which the drive signals for the two controllable semiconductor switches are generated by signal electronics, and the voltage is made available to the load from the two nodes, e.g., the connection points of the respective diode with the respective semiconductor switch, of the respective half bridge.

Thus, the load, e.g., the coil, is provided with a voltage which is provided between the nodes of the two half-bridges of the parallel connection. An AC voltage is provided at its AC-side terminal, which feeds the inverter. The DC-side terminal provides a unipolar voltage to the load. Phase angle control is implemented, e.g., for a respective positive half-wave of the AC voltage, but this is only passed through to such an extent that the target voltage can be reached. For this purpose, the second phase angle is set to a value between 0° and 180°.

According to example embodiments, with two controllable semiconductors arranged in series, the semiconductor switches are controlled such that, at the zero crossing of the AC voltage or the associated current, e.g., all of them are opened or only the two upper semiconductor switches of the two series connections are opened and the two lower semiconductor switches of the two series connections are closed. Thus, that no voltage is provided to the load after the zero crossing.

According to example embodiments, the actual value of the current supplied to the load is captured, e.g., averaged over a period of the AC voltage, and the second phase angle is set such that the actual value is adjusted to a target value of the current, and, for example, only a single value is assigned to the second phase angle in each period of the AC voltage. Thus, the value is only changed in the cycle of the pulse-width modulation and high-frequency overregulation is avoidable. In addition, this behavior, which is similar to a low-pass filter, prevents the forming of high-frequency oscillations.

According to example embodiments, in a respective period of the AC voltage, the first phase angle is determined, e.g., depending on the second phase angle of the respective period of the AC voltage, such that it has a predetermined, e.g., constant, angular distance from the second phase angle, and, for example, the angular distance is between 10° and 45°, e.g., between 30° and 40°, e.g., so that in case of a change of the second phase angle the curve has to be adjusted. Thus, sufficient time is provided for the smooth curve.

According to example embodiments, the pulse-width modulation frequency is between 5 kHz and 100 kHz, e.g., in the non-audible range and/or between 15 and 30 kHz. Thus, there are fewer audible noise emissions.

According to example embodiments, the AC voltage is captured, e.g., averaged over a period of the AC voltage, and for releasing the brake the second phase angle is controlled such that a target voltage of the coil applied to the coil is provided. Thus, the voltage applied to the coil is controllable.

According to example embodiments, the voltage applied to the coil is captured, e.g., averaged over a period of the AC voltage, and for releasing the brake the second phase angle is set such that the captured voltage is regulated to a target voltage value. Thus, the voltage applied to the coil can be regulated.

According to example embodiments, no voltage is made available to the coil for applying the brake, i.e., for example, the coil is short-circuited or a countervoltage is applied for a period of time, after which no more voltage is made available to the coil. Thus, the coil can be de-excited quickly. However, this requires a parallel connection of two half-bridges, each of which has a series connection of two controllable semiconductor switches so that a countervoltage can be generated.

According to example embodiments, the actual value of the current supplied to the load is captured, e.g., averaged over a period of the AC voltage, and the voltage applied to the coil is captured, e.g., averaged over a period of the AC voltage, and a power is determined from the captured actual value of the current and the captured voltage applied to the coil, from the time curve of which a temperature of the brake, e.g., a temperature of the coil or a temperature of a magnetic body of the brake accommodating the coil, is determined using a thermal model of the brake, and, for example, a controller, e.g., the controller, uses at least one temperature-dependent parameter, e.g., the ohmic resistance of the coil. Thus, the current detection is not only used for a current controller but also for the determination of a temperature, which, on the one hand, can be monitored for exceeding a threshold value and thus a warning can be issued, but, on the other hand, a temperature-dependent parameter of the controller can be tracked to the thermal changes and thus an improved control can be obtained.

According to example embodiments, a device, e.g., for carrying out the method described herein, includes a rectifier, e.g., a half-wave rectifier, whose AC-side terminal feeds an AC voltage, e.g., a single-phase AC voltage. The DC-side terminal of the rectifier feeds a parallel connection of two half-bridges of the device, each of which has a series connection of two controllable semiconductor switches whose drive signals are generated by signal electronics of the device, and the voltage applied between the two nodes of the respective half bridges, e.g., the connection points of the two semiconductor switches of the respective half bridge, is made available to a load; or the DC-side terminal of the rectifier feeds a parallel connection of two half-bridges of the device, the first of the half-bridges has a series connection of a first controllable semiconductor switch and a first diode and the second of the half-bridges has a series connection of a second controllable semiconductor switch and a second diode, the drive signals for the first and the drive signals for the second semiconductor switch are generated by signal electronics of the device, the voltage applied between the two nodes of the respective half-bridges, e.g., the connection points of the respective diode and the respective semiconductor switch of the respective half-bridge, is made available to a load, and, for example, the first controllable semiconductor switch is connected to the upper potential of the DC-side terminal of the rectifier and the second controllable semiconductor switch is connected to the lower potential of the DC-side terminal of the rectifier.

Thus, when using two half bridges, each having a series connection of two semiconductor switches, a countervoltage can be generated to quickly de-excite the coil, i.e., to apply the brake.

According to example embodiments, a capacitance and a varistor are connected in parallel to the DC-side terminal of the rectifier. Thus, the capacitance acts as a non-polar capacitor and thus as a filter element. The varistor, on the other hand, provides for a quick de-excitation of the coil and thus a quick application of the brake.

According to example embodiments, the load is the coil of an electromagnetically actuated brake, e.g., of an electric motor. Thus, when the coil is energized, an armature disk can be axially removed from the brake lining carrier against the force generated by spring elements, and thus a releasing of the brake lining carrier can be effected.

According to example embodiments, the signal electronics are adapted to form the drive signals in a pulse-width modulated manner. Thus, the voltage can be controlled according to a curve.

Further features and aspects of example embodiments of the present invention are explained in more detail below with reference to the appended schematic Figures.

DETAILED DESCRIPTION

Figure 1:
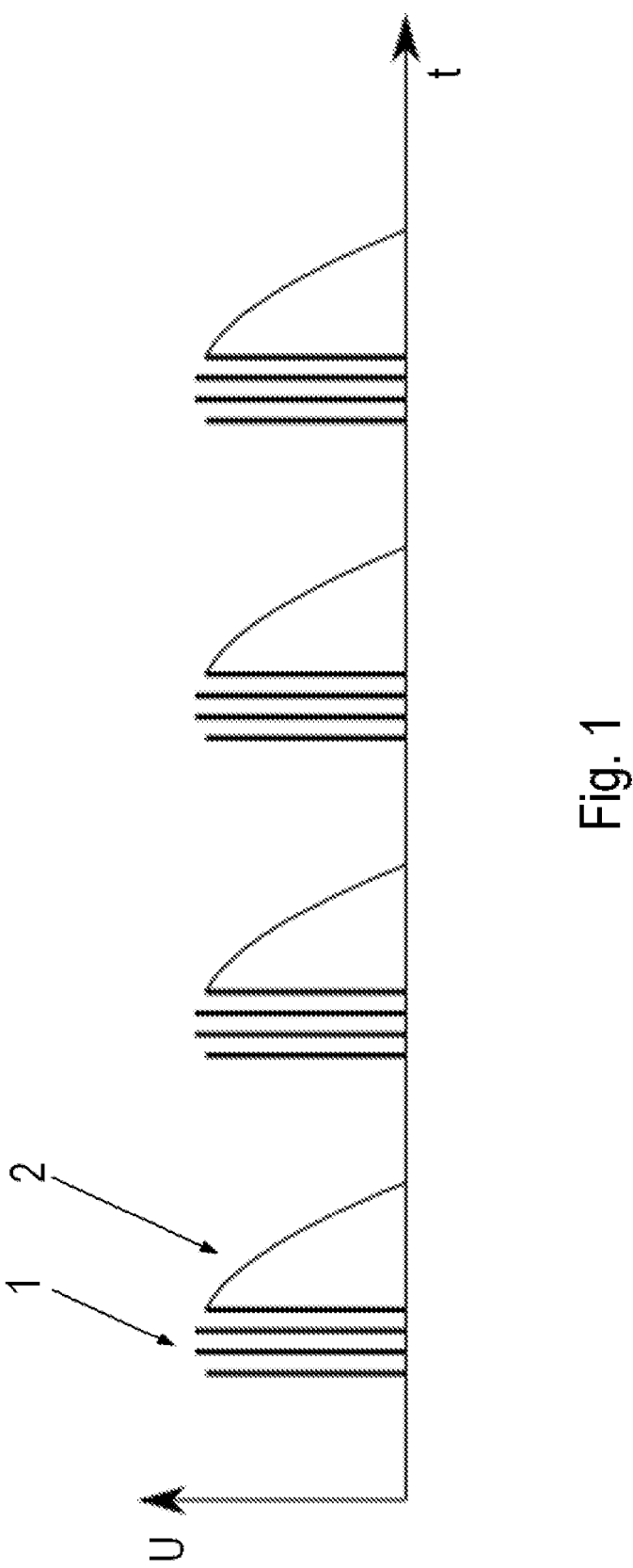
FIG. 1 illustrates a method for controlling the voltage for supplying a load, e.g., a coil of an electromagnetically actuated brake, e.g., of an electric motor or for an electric motor, in which a pulse width modulation 2 is carried out before the start time of a phase angle control 2.

As illustrated in FIG. 1, in contrast to a phase angle control, the voltage U is not switched on immediately at a point in time, but is first pulse-width modulated and then switched on completely.

For example, the positive half-waves of a single-phase AC voltage are fed to a parallel connection of two half-bridges, each of which has a series connection of two controllable semiconductor switches whose drive signals are generated by signal electronics. A voltage is made available to the load from the two nodes, e.g., the connection points of the two semiconductor switches of the respective half-bridge.

The controllable semiconductor switches are operated with pulse width modulation starting from a first phase angle of the AC voltage and repeating periodically with the mains period. For example, the pulse width modulation ratio is controlled as a function of time such that a voltage curve that increases from zero is made available to the load.

After a period of time, e.g., when reaching a second value of phase angle, e.g., a second phase angle, of the AC voltage, the pulse width modulation is terminated and the semiconductor switches are driven with a constant voltage signal, so that the voltage waveform following the positive half-wave is substantially directly provided to the load.

At zero crossing of the voltage the semiconductor switches are controlled such that, e.g., all of them are opened or only the two upper semiconductor switches of the two series connections are opened and the two lower semiconductor switches of the two series connections are closed. Thus, the voltage supplying the load remains at a vanishing value, e.g., zero, until the next positive half-wave of the AC voltage reaches the first value.

In this manner, a discontinual increase of the voltage at the first value of the phase angle can be avoided, and the voltage is ramped up according to a, e.g., continual and differentiable, e.g., smooth voltage curve, until the voltage present at the second value of the phase angle is reached.

A voltage curve that follows an S-curve may be provided, so that the first time derivative of the voltage curve is zero at the first value and, e.g., also at the second value. The slope is, for example, a linear function of the length of the voltage curve as a function of time. Thus, the voltage curve is, for example, a clothoid section.

For example, the voltage curve is particularly smooth if the second, e.g., and the third, time derivative of the voltage curve is always smaller than a threshold value.

An IGBT or MOSFET is, for example, used as the controllable semiconductor switch.

The coil is housed in a magnetic body, which is connected to the housing of the electric motor. A rotor shaft of the electric motor is rotatably mounted by bearings which are accommodated in the housing. A driver is connected to the rotor shaft in a rotationally fixed manner, e.g., fitted onto the rotor shaft, and the driver has an external toothing which is in engagement with an internal toothing of a brake lining carrier, which is thus connected to the driver in a rotationally fixed but axially displaceable manner. When the coil is energized, an armature disk made of ferromagnetic material, which is connected to the magnet body in a rotationally fixed but axially displaceable manner, is pulled towards the magnet body against the spring force generated by spring elements supported on the magnet body. When the coil is not energized, the spring elements press the armature disk onto the brake lining carrier, which is thus pressed onto a braking surface formed on the housing, e.g., on a bearing shield of the housing, to generate braking torque for the rotor shaft. For example, the coil supplied with unipolar voltage acts as an electromagnetic actuator of the brake.

According to the measures described herein, noise emissions, switching losses, and EMC emissions can be reduced. This is because the smooth, i.e., continually differentiable voltage curve has fewer harmonics.

For example, a sinusoidal voltage curve is used as a function of time, in which at the first value the time derivative of the voltage curve is zero, i.e., a local minimum, e.g., low point, of a sinusoidal function is provided, and at the second value the time derivative of the voltage curve transitions continually into the time derivative of the voltage curve following the positive half-wave.

Figure 2:
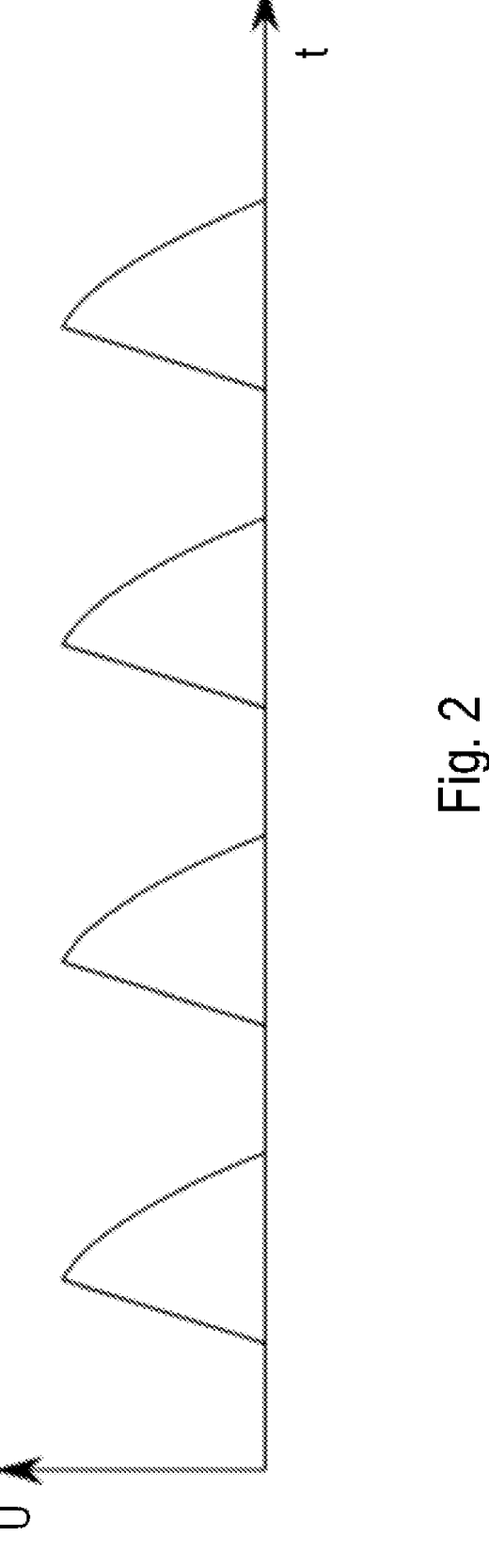
FIG. 2 illustrates that a continuous increase of the voltage is carried out, in contrast to the pulse width modulation 1 illustrated in FIG. 1.

As illustrated in FIG. 2, however, a discontinual jump in the voltage curve can also be avoided by connecting a controllable semiconductor switch, e.g., a MOSFET, in series with the load, e.g., the brake coil, and supplying this series connection from a rectifier, e.g., a half-wave rectifier. Thus, by continually increasing the control voltage of the controllable semiconductor switch, it is possible to continually decrease the conduction resistance of the controllable semiconductor switch, resulting in a continual increase in the voltage provided to the load.

Figure 3:
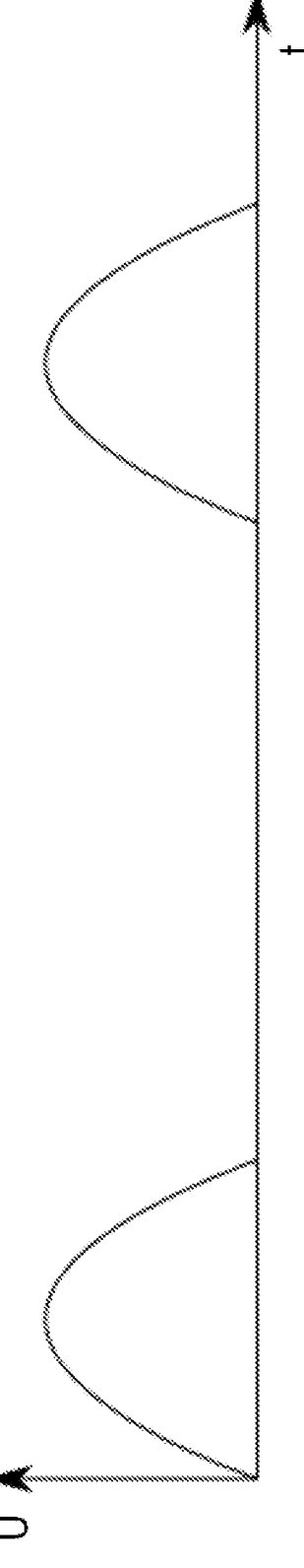
FIG. 3 illustrates a pulse packet control of the voltage.

As illustrated in FIG. 3, by using a controllable rectifier, e.g., a half-wave rectifier, less than all positive half-waves can be made available to the load. The voltage averaged over several mains periods and made available to the load is thus lower than when an uncontrolled half-wave rectifier is used.

Figure 4:
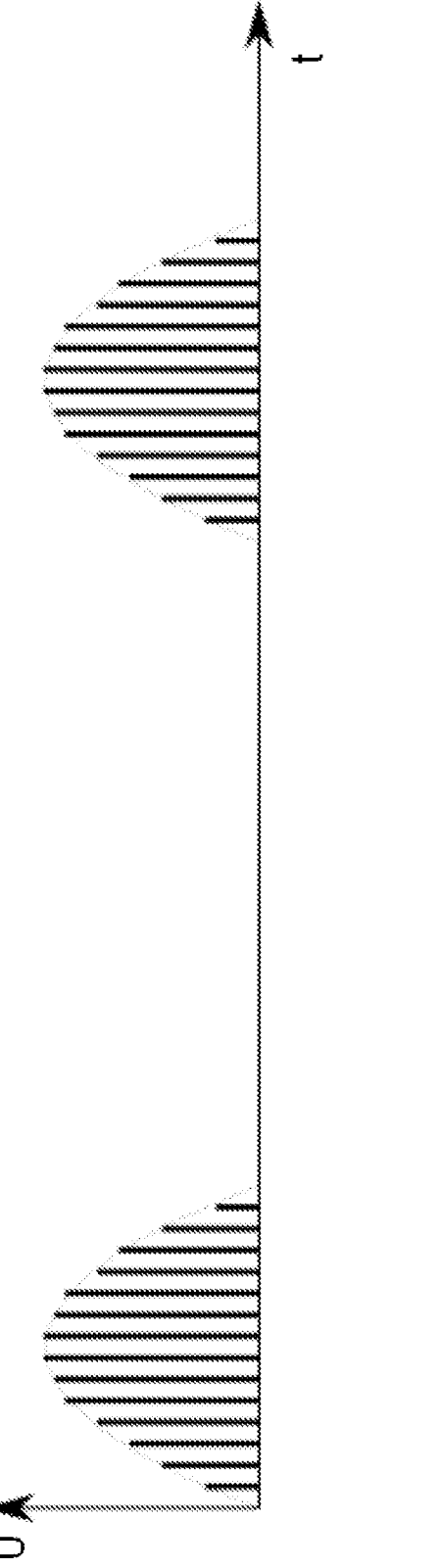
FIG. 4 illustrates a pulse-width modulated pulse packet control.

However, as illustrated in FIG. 4, the half-bridge arrangement described in connection with FIG. 1 allows pulse-width modulated operation during a respectively selected positive half-wave of the AC voltage. Thus, a smooth voltage curve, e.g., one that is only below a threshold value, can be made available to the load. For example, during one of the positive half-waves, a sinusoidal voltage curve can be made available to the load, which has a low point at the beginning of the positive half-wave and also has a low point at the end of the positive half-wave, in which the voltage applied to the load at the respective low point is zero. Alternatively, however, a voltage curve having clothoid sections can be obtained. Thus, the voltage curve is again smooth.

Figure 5:
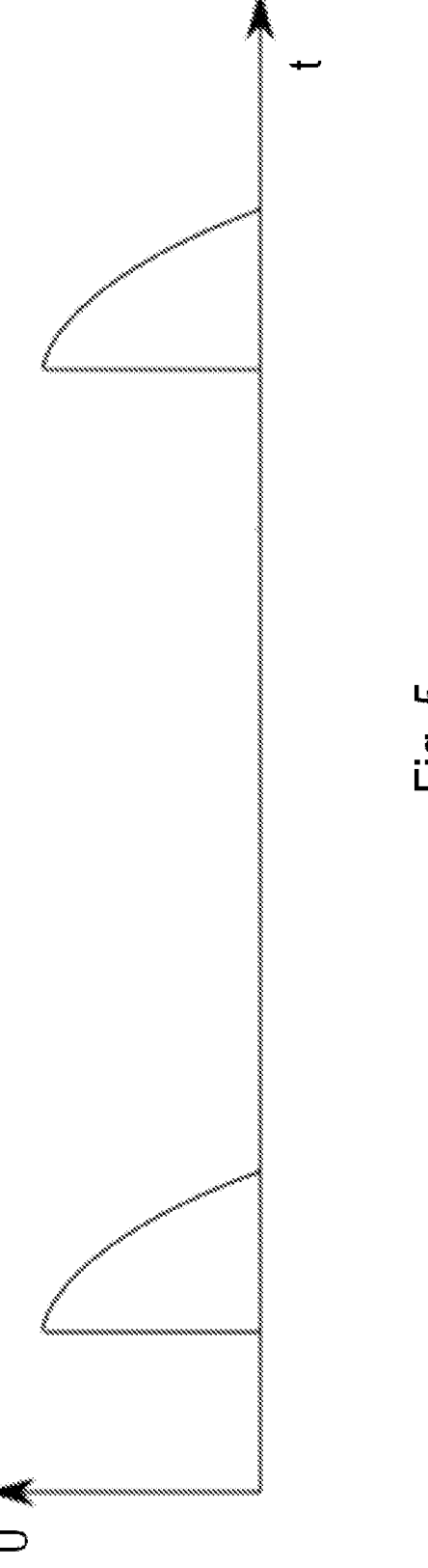
FIG. 5 illustrates a pulse packet control with phase angle.

As illustrated in FIG. 5, not every positive half-wave of the AC voltage is passed through and, moreover, only a part of the positive half-wave is passed through by a phase angle control.

Figure 6:
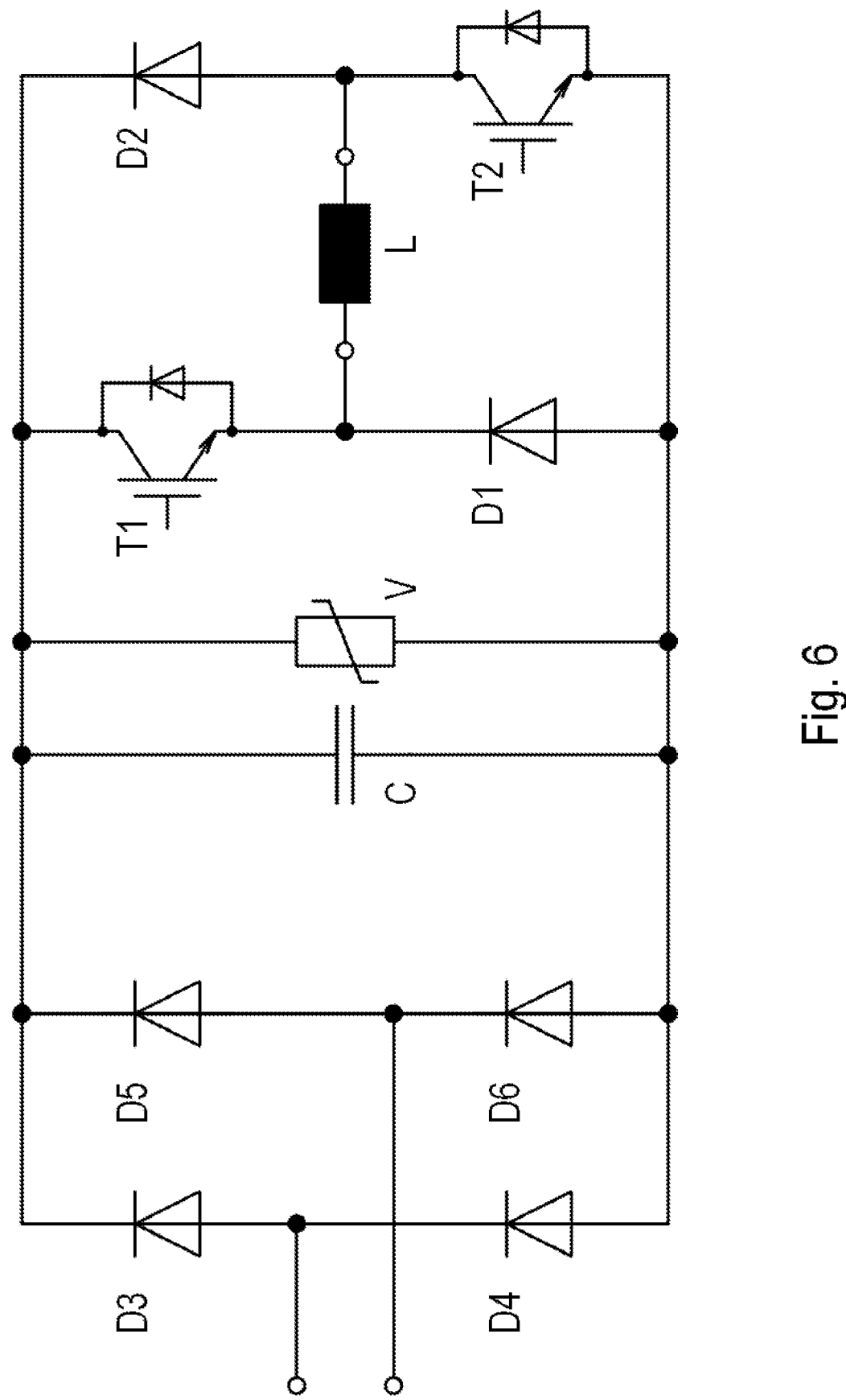
FIG. 6 illustrates an arrangement for carrying out the method.

As illustrated in FIG. 6, the arrangement for carrying out the above methods has a bridge rectifier formed by a parallel connection of two series connections. For example, the first of the series connections is a diode D3 connected in series with a diode D4, and the second of the series connections is a diode D5 connected in series with a diode D6.

A capacitor C, which is used for filtering, is connected in parallel to the parallel circuit. For example, the capacitor is not arranged as a polar capacitor, for example, as a film capacitor.

A varistor V, which is provided when the coil L is de-excited, is connected in parallel to capacitor C.

A further parallel circuit is connected in parallel to the parallel circuit, which further parallel circuit includes two half bridges, in which the first of the half bridges includes the series connection of a controllable semiconductor switch T1 and a diode D1, in which the controllable semiconductor switch T1 is connected to the upper potential of the DC-side terminal of the bridge rectifier.

The second of the half-bridges includes the series connection of a controllable semiconductor switch T2 and a diode D2, in which the controllable semiconductor switch T2 is connected to the lower potential of the DC-side terminal of the bridge rectifier.

For example, flyback diodes are connected in parallel to each of the two controllable semiconductor switches (T1, T2).

A voltage is provided to the coil L from the nodes of the two half-bridges.

By synchronous pulse-width modulated control of the two controllable semiconductor switches T1 and T2, a voltage corresponding to the pulse-width modulation ratio is made available to the coil L, which is dependent on the voltage at the DC-side terminal of the rectifier.

To de-excite the coil, the lower controllable semiconductor switch T2 is set to the conductive state and the upper controllable semi-conductor switch T1 is opened. Thus, the coil current is then free via the semiconductor switch T2 and the diode D1.

For rapid de-excitation of the coil L, both semiconductor switches T1 and T2 are closed, so that the coil current flows via the varistor V, which converts the energy of the coil L into heat. In this manner, a particularly fast de-excitation, i.e., a particularly fast application of the brake, can be achieved. This is because, after the magnetic field generated by the coil has dissipated, the spring elements press the armature disk onto the brake lining carrier, which is thus pressed onto the braking surface.

The current flowing through coil L is captured by a current sensor. The current values captured in this manner are fed as actual values to a controller in the signal electronics, which controller sets the second phase angle such that the actual values are adjusted to a target current value, for example, the target value for the holding current of the brake for permanent release of the brake. However, if the voltage is set at the brake, this controller does not necessarily have to be activated.

In addition, however, the current values captured are also used together with the voltage applied to the coil L and captured by a sensor for capturing voltage, to determine the electrical power of the coil. This is because this electrical power heats the coil and causes a temperature of the coil that depends on the time curve of this electrical power. The ohmic resistance of the coil depends on this temperature and is taken into account as a parameter in the control.

To determine the temperature, a thermal model is used which takes into account as parameters the heat capacities and heat transfer resistances of the brake's magnetic body, the coil and the other components of the brake.

LIST OF REFERENCE CHARACTERS

1 Pulse-width modulation
2 Phase angle control
D1 Diode
D2 Diode
D3 Diode
D4 Diode
D5 Diode
D6 Diode
T1 Controllable semiconductor switch
T2 Controllable semiconductor switch
V Varistor
C Capacitor
L Inductor, coil

The invention claimed is:

1. A method for providing a voltage for a load, comprising:

providing positive half-waves of an AC voltage to the load in a pulse-width modulated manner starting from a first phase angle of the AC voltage and in an unmodulated manner starting from a second phase angle; and controlling a pulse—with modulation ratio as a function of time and/or of phase angle between the first phase angle and the second phase angle so that an increasing curve of the voltage and/or a curve of the voltage that increases from zero and is averaged using a moving average over a pulse—with modulation period is made available to the load.

2. The method according to claim 1, wherein the load includes an inductor and/or a coil of an electromagnetically actuable brake and/or an electromagnetically actuable brake of an electric motor.

3. The method according to claim 2, wherein no voltage is made available to the coil for applying the brake, after which no more voltage is made available to the coil.

4. The method according to claim 2, wherein an actual value of current supplied to the load is captured and/or averaged over a period of the AC voltage, and voltage applied to the coil is captured and/or averaged over a period of the AC voltage, a power is determined from the captured actual value of the current and the captured voltage applied to the coil, from a time curve of which a temperature of the brake, of the coil, and/or of a magnetic body of the brake accommodating the coil is determined using a thermal model of the brake.

5. The method according to claim 4, wherein a controller uses at least one temperature-dependent parameter and/or an ohmic resistance of the coil.

6. The method according to claim 1, wherein the providing is repeated over time.

7. The method according to claim 1, wherein the positive half-waves are generated by a half-wave rectifier and/or are rectified half-waves generated by a rectifier, a bridge rectifier, and/or a mid-point rectifier.

8. The method according to claim 1, wherein the AC voltage includes a single-phase AC voltage.

9. The method according to claim 1, wherein, at the first phase angle, a first time derivative of the curve is zero and/or, at the second phase angle, the first time derivative of the curve is continual.

10. The method according to claim 1, wherein the curve is smooth, is continually differentiable, has clothoidal sections and/or sinusoidal sections, and/or has an S-curve.

11. The method according to claim 1, wherein the positive half-waves of a single-phase AC voltage are fed to a parallel connection of two half-bridges, each half-bridge having a series connection of two controllable semiconductor switches whose drive signals are generated by signal electronics, the voltage being made available to the load from two nodes and/or connection points of the two semiconductor switches, of a respective half-bridge.

12. The method according to claim 11, wherein, at a zero crossing of the AC voltage, the semiconductor switches are controlled to all be open or to open only upper semiconductor switches and to close lower semiconductor switches.

13. The method according to claim 1, wherein the positive half-waves of a single-phase AC voltage are fed to a parallel connection of two half-bridges, each half-bridge having a series connection of a controllable semiconductor switch and a diode, drive signals for the controllable semiconductor switches being generated by signal electronics, the voltage being made available to the load from two nodes and/or connection points of a respective diode with a respective semiconductor switch of a respective half bridge.

14. The method according to claim 1, wherein a pulse-width modulation frequency is between 5 kHz and 100 kHz, in a non-audible range, and/or between 15 and 30 KHz.

15. A device adapted to perform the method recited in claim 1, comprising:

a rectifier having AC-side terminal adapted to feed the AC voltage;

wherein a DC-side terminal of the rectifier is adapted to feed a parallel connection of two half-bridges of the device, each half-bridge including a series connection of two controllable semiconductor switches whose drive signals are generated by signal electronics of the device, a voltage applied between two nodes and/or two connection points of the respective half bridges being made available to the load; or wherein the DC-side terminal of the rectifier is adapted to feed a parallel connection of two half-bridges of the device, a first one of the half-bridges including a series connection of a first controllable semiconductor switch and a first diode and a second one of the half-bridges including a series connection of a second controllable semiconductor switch and a second diode, drive signals for the first semiconductor switch and for the second semiconductor switch being generated by signal electronics of the device, a voltage applied between two nodes of the half-bridges and/or between connection points of a respective diode and a respective semiconductor switch of a respective half-bridge is made available to the load.

16. The device according to claim 15, wherein the first controllable semiconductor switch is connected to an upper potential of the DC-side terminal of the rectifier and the second controllable semiconductor switch is connected to a lower potential of the DC-side terminal of the rectifier.

17. The device according to claim 15, wherein the rectifier includes a half-wave rectifier, a bridge rectifier, and/or a mid-point rectifier, and the AC voltage includes a single-phase AC voltage.

18. The device according to claim 15, wherein the load includes a coil of an electromagnetically actuated brake and/or an electromagnetically actuated brake of an electric motor.

19. The device according to claim 15, wherein the signal electronics are adapted to form the drive signals in a pulse-width modulated manner.

20. A method for providing a voltage for a load, comprising:

providing positive half-waves of an AC voltage to the load in a pulse-width modulated manner starting from a first phase angle of the AC voltage and in an unmodulated manner starting from a second phase angle, wherein the load includes an inductor and/or a coil of an electromagnetically actuable brake and/or an electromagnetically actuable brake of an electric motor; and controlling a pulse—with modulation ratio as a function of time and/or of phase angle between the first phase angle and the second phase angle so that an increasing curve of the voltage and/or a curve of the voltage that increases from zero and is averaged using a moving average over a pulse—with modulation period is made available to the load.

21. A method for providing a voltage for a load, comprising:

providing positive half-waves of an AC voltage to the load in a pulse-width modulated manner starting from a first phase angle of the AC voltage and in an unmodulated manner starting from a second phase angle;

wherein an actual value of current supplied to the load is captured and/or averaged over a period of the AC voltage, and the second phase angle is set to adjust the actual value to a target value of the current.

22. A method for providing a voltage for a load, comprising:

providing positive half-waves of an AC voltage to the load in a pulse-width modulated manner starting from a first phase angle of the AC voltage and in an unmodulated manner starting from a second phase angle;

wherein, in a respective period of the AC voltage, the first phase angle is determined and/or determined depending on the second phase angle of a respective period of the AC voltage, to have a predetermined and/or constant angular distance from the second phase angle.

23. The method according to claim 22, wherein the angular distance is between 20° and 45° and/or between 30° and 40°.

24. A method for providing a voltage for a load, comprising:

providing positive half-waves of an AC voltage to the load in a pulse-width modulated manner starting from a first phase angle of the AC voltage and in an unmodulated manner starting from a second phase angle;

wherein the load includes an inductor and/or a coil of an electromagnetically actuable brake and/or an electromagnetically actuable brake of an electric motor; and wherein the AC voltage is captured and/or averaged over a period of the AC voltage, and, to release the brake, the second phase angle is controlled so that a target voltage of the coil applied to the coil is provided.

25. A method for providing a voltage for a load, comprising:

providing positive half-waves of an AC voltage to the load in a pulse-width modulated manner starting from a first phase angle of the AC voltage and in an unmodulated manner starting from a second phase angle;

wherein the load includes an inductor and/or a coil of an electromagnetically actuable brake and/or an electromagnetically actuable brake of an electric motor; and wherein a voltage applied to the coil is captured and/or averaged over a period of the AC voltage, and, to release the brake, the second phase angle is set so that the captured voltage is regulated to a target voltage value.

* * * * *